No. 616,428. Patented Dec. 20, 1898.
W. W. SNOWMAN.
INDICATOR FOR SHIPS' COMPASSES.
(Application filed Oct. 18, 1897.)
(No Model.)
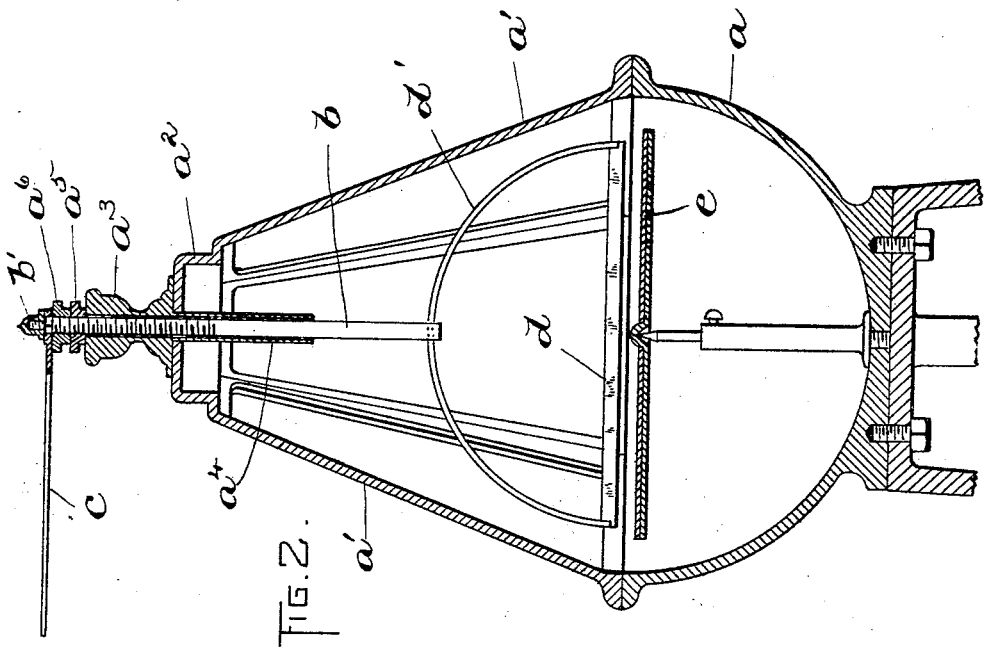
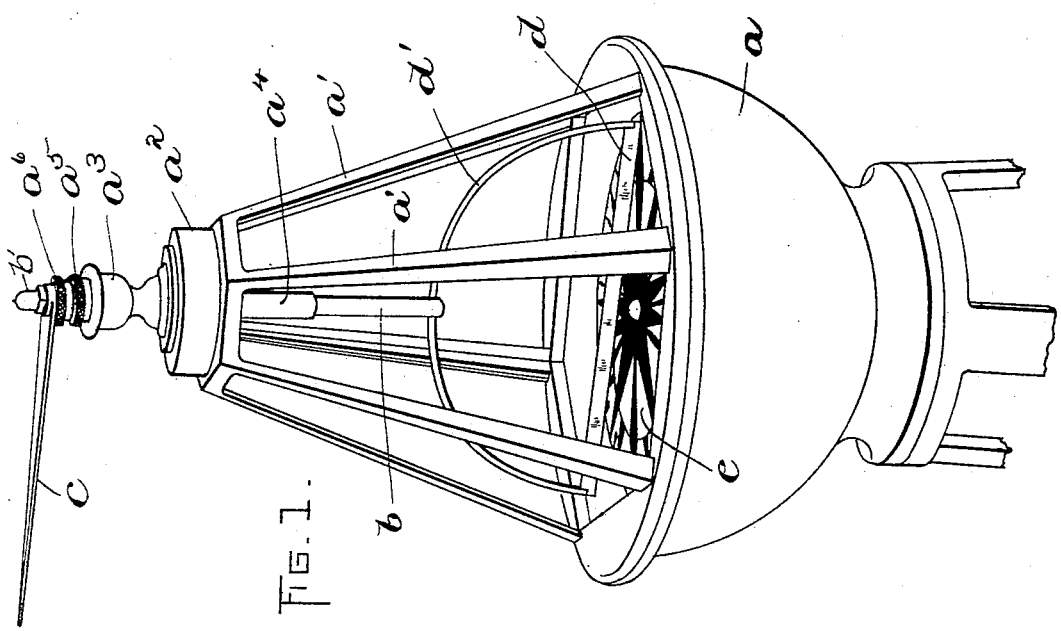
WITNESSES:
INVENTOR:

United States Patent Office.

WILLIAM W. SNOWMAN, OF BOSTON, MASSACHUSETTS, ASSIGNOR, BY DIRECT AND MESNE ASSIGNMENTS, OF ONE-HALF TO H. P. ARBECAM AND HERMAN W. LADD, OF SAME PLACE, AND WM. E. AYRES, OF WOBURN, MASSACHUSETTS.

INDICATOR FOR SHIPS' COMPASSES.

SPECIFICATION forming part of Letters Patent No. 616,428, dated December 20, 1898.

Application filed October 18, 1897. Serial No. 655,595. (No model.)

*To all whom it may concern:*

Be it known that I, WILLIAM W. SNOWMAN, of Boston, in the county of Suffolk and State of Massachusetts, have invented certain new and useful Improvements in Indicators for Ships' Compasses, of which the following is a specification.

This invention has for its object to provide an improved indicating device for ships' compasses, whereby the bearings of an object at a distance from the ship may be taken with accuracy and indicated at once on the dial of the compass.

To this end the invention consists in the improvements which I shall now proceed to describe and claim.

Of the accompanying drawings, forming a part of this specification, Figure 1 represents a perspective view of a compass provided with my improved bearing-indicator. Fig. 2 represents a median vertical section of the same.

The same reference characters indicate the same parts in both figures.

Referring to the drawings, $a$ designates the compass-box of a binnacle, and $a'$ $a'$ designate the side arms or supports forming the framework of the binnacle-top. The upper ends of said arms support a top piece $a^2$, on the upper side of which is a metal cap $a^3$, which is provided with a central socket extending downwardly through a fixed tube $a^4$. In said socket is rotatably mounted a vertical shaft or spindle $b$, to the upper end of which is affixed a hand or pointer $c$ and to the lower end of which is rigidly affixed a dial-bar $d$ by means of a curved suspending-arm $d'$, secured at both ends to said bar and at its middle point to the shaft $b$. The upper end of the shaft $b$ is squared and shouldered to engage the apertured end of the pointer $c$ and is screw-threaded and provided with a clamping-nut $b'$, by means of which the pointer is firmly clamped on the shaft $b$.

The pointer $c$ and dial-bar $d$ are arranged on the shaft $b$ in the same vertical plane, so that when the pointer points in a certain direction the dial-bar also points in that direction.

$e$ designates the compass-dial, which is or may be of the usual or any suitable construction and is marked in the usual manner. The dial-bar $d$, which is preferably a thin perfectly straight piece of metal set up edgewise, is centrally suspended a short distance above the dial $e$, so as to revolve on a pivot coinciding with the center of the dial, and in whatever direction it is turned it will indicate a bearing on the dial, which will be the same bearing as that indicated by the pointer $c$. Therefore when the pilot, helmsman, or other person on the ship wishes to ascertain the bearing of an object—such as a lighthouse, for instance—within sight of the ship he merely turns the pointer $c$ so that it points exactly in the direction of the object and then reads the bearing directly from the compass-dial, as indicated by the bar $d$.

As a means for raising and lowering the dial-bar $d$ so as to adjust its distance from the dial $e$ I screw-thread the upper portion of the shaft $b$, as shown in Fig. 2, and provide an adjusting thumb-nut $a^5$, which may be turned to raise or lower the shaft, and a lock-nut $a^6$ for locking the thumb-nut in place on the shaft. As the shaft is free to slide longitudinally in its socket, the nut $a^5$ will rest on top of the cap or knob $a^3$, as shown.

Ships' binnacles are made in various forms, but are almost universally of such a construction as to admit of the attachment of my improved appliance.

An important feature of the invention is the connection between the lower end of the shaft $b$ and the dial-bar $d$ by means of the bowed rod $d'$. This arrangement permits of a clear and unobstructed view of the "lubber-mark" on the edge of the dial-casing. Compass-indicators are at present constructed in which a vertical shaft is employed similar to the shaft $b$, but extending close down to the dial, and hence obstructing to some extent the view of the lubber-mark and that part of the dial adjacent thereto, making it necessary for the observer to look around the said shaft, and hence to read at an improper angle when observing the ship's course. The exact shape or formation of the bowed arm $d'$ is of course immaterial to my invention, and it will also be apparent that it is unnecessary that the dial-indicator shall be a continuous bar, such as the bar $d$, extending entirely across the dial, for the two lower ends of the bowed arm $d'$, if diametrically opposite each other, would serve as an indicator without any connecting-bar.

Having thus explained the nature of the invention and described a way of constructing and using the same, though without attempting to set forth all of the forms in which it may be made or all of the modes of its use, I declare that what I claim is—

An indicator for ships' binnacles, comprising a vertical shaft extending through the binnacle-top and terminating inside of the binnacle a considerable distance above the compass-dial, a bowed arm attached to the lower end of said shaft and extending downwardly toward and nearly to the margin of the dial, but not touching the same, and a hand or pointer attached to the upper end of the shaft in the same plane with the ends of the bowed arm.

In testimony whereof I have signed my name to this specification, in the presence of two subscribing witnesses, this 12th day of October, A. D. 1897.

WM. W. SNOWMAN.

Witnesses:
   C. F. BROWN,
   A. D. HARRISON.